2,812,376
ELECTRIC BATTERY

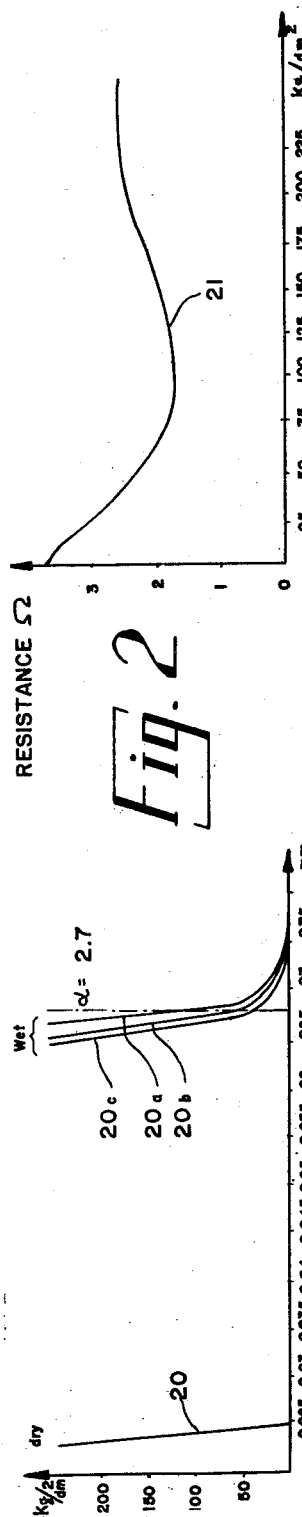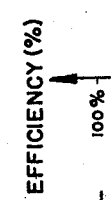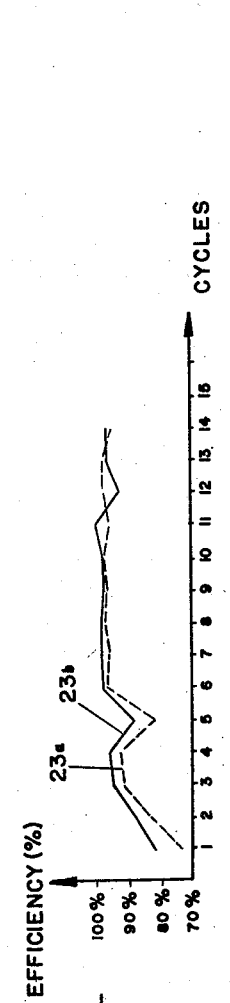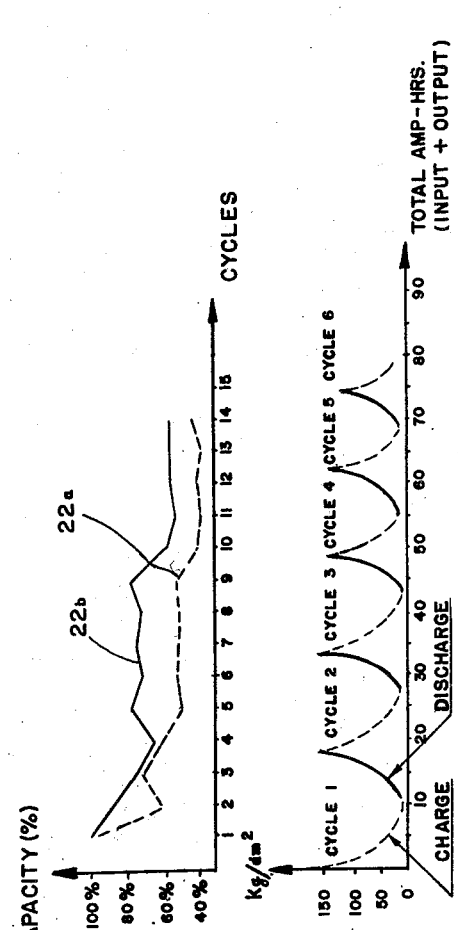
Nov. 5, 1957     M. N. YARDNEY     2,812,376
ELECTRIC BATTERY
Filed March 7, 1952     2 Sheets-Sheet 1
INVENTOR.
MICHEL N. YARDNEY
BY Karl F. Ross
AGENT Nov. 5, 1957 — M. N. YARDNEY — 2,812,376
ELECTRIC BATTERY
Filed March 7, 1952 — 2 Sheets-Sheet 2
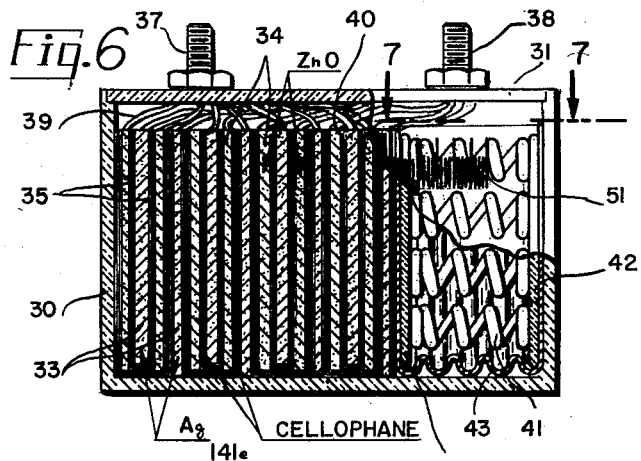
Fig.6
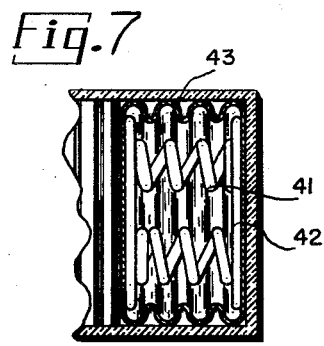
Fig.7
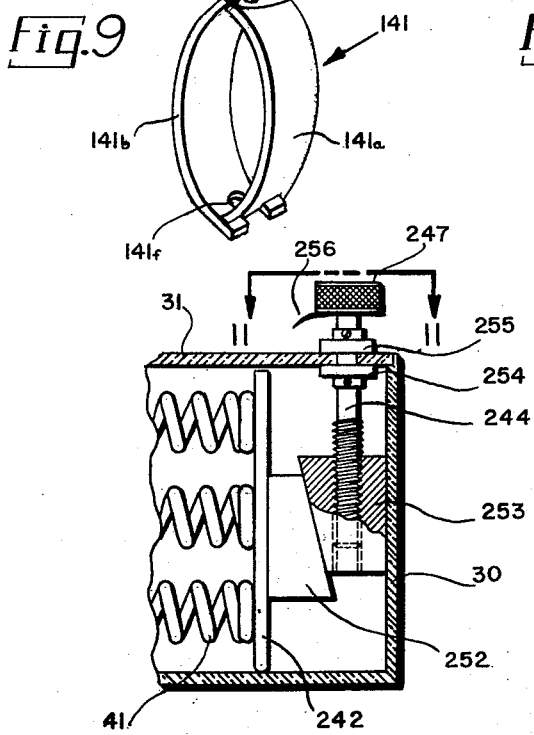
Fig.9
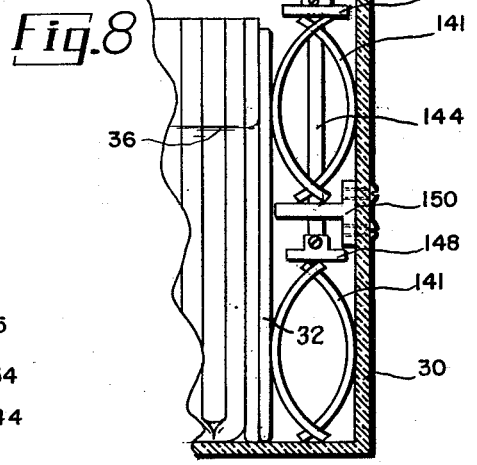
Fig.8
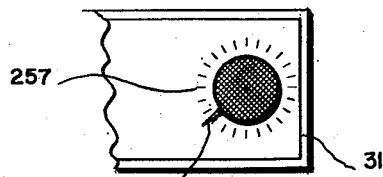
Fig.10
Fig.11
INVENTOR.
MICHEL N. YARDNEY
BY
Karl F. Ross
AGENT United States Patent Office 2,812,376
Patented Nov. 5, 1957

Michel N. Yardney, New York, N. Y., assignor to Yardney International Corp., New York, N. Y., a corporation of New York Application March 7, 1952, Serial No. 275,284

6 Claims. (Cl. 136—6)

This invention relates to electric batteries of the type in which two electrodes of opposite polarity, held under considerable pressure in a casing containing a preferably alkaline electrolyte, are electrically separated by a semi-permeable spacer of a swellable material (e. g. cellophane) whose interstices are substantially prevented from widening by virtue of the compression of the spacer between the electrodes. A battery of this character has been described, for example, in co-pending U. S. application Ser. No. 197,730, filed November 27, 1950, by Henri G. André and owned by the assignee of the present application.

As explained in said co-pending application, the amount of pressure maintained inside the battery casing is of considerable importance in regard to the performance of the battery, in terms of both storage capacity and rechargeability. In particular, it has been found that capacity is at an optimum within a relatively narrow pressure range, and that both capacity and rechargeability drop off rapidly if the pressure falls below a predetermined limit given with substantially 15 kg./dm.$^2$. Said application also describes a method of arriving at the desired pressure by suitably selecting the ratio of the thicknesses of the swellable material and of the other battery elements when introduced in the dry state into the casing.

It has now been found that the performance of a practical battery designed for a certain pressure occasionally approximates that expected of a battery with considerably lower design pressure. Experiments have shown that the pressure actually prevailing in such batteries over a considerable part of a cycle is substantially below the calculated value, this being believed due to the fact that the reduction of the oxide which constitutes the negative electrode, occurring during the charging of the battery, results in an appreciable diminution of the volume occupied by the negative electrode, not counterbalanced by any corresponding increase in the thickness of the positive electrode, whereby the pressure inside the casing is caused to drop. Another possible source of abberrations from the calculated value resides in the fact that the pressure-versus-thickness ratio of the swellable separator material may change during prolonged use thereof in a battery, as a result of a phenomenon akin to the fatiguing of elastic materials.

The general object of the present invention is to provide means to counteract, at least to a substantial extent, the said diminution of volume with a view to maintaining constant, or nearly constant, the pressure obtaining inside the battery casing for the purpose of improving the performance of the battery.

It is also an object of this invention to provide, in a battery of the character described, means for substantially preventing the occurrence of a gradual loss in pressure due, for example, to a slow dislocation of the active electrode material during prolonged use, or to the above-mentioned separator fatigue, with a view to increasing the useful life span as well as the storage capacity of the battery.

A further object of the invention, allied with the preceding one, is to provide readily manipulable adjusting means for manually resetting the internal pressure of the battery if, for any reason whatever, the same has fallen to too low a value; and, preferably in conjunction therewith, means for ascertaining the magnitude of said internal pressure.

The above and other objects of the invention will become apparent from the following detailed description, reference being had to the accompanying drawing in which:

Fig. 1 is a graph illustrating the fatiguing of a particular type of cellophane used as a separator material;

Fig. 2 is a graph illustrating the variations in the electrical resistance of a sheet of cellophane, having the characteristics shown in Fig. 1, as a function of pressure;

Fig. 3 is a graph illustrating the variations in the internal pressure, during successive charge-discharge cycles, of a battery of the type described above;

Fig. 4 is a graph comparing the measured capacities of two substantially identical cells, one cell being provided with pressure-equalizing means according to the invention, the other cell being not so provided;

Fig. 5 is a graph similar to Fig. 4, comparing the efficiencies of the two cells referred to in connection with the latter figure;

Fig. 6 is an elevation, partly in section, of a battery representing an embodiment of the present invention;

Fig. 7 is a fragmentary section taken on the line 7—7 of Fig. 6;

Fig. 8 shows, on a larger scale, part of a battery similar to that of Fig. 6 (with the front wall of the casing removed) but having modified pressure-equalizing means;

Fig. 9 is a detail view, in perspective, of the pressure-equalizing means of Fig. 8;

Fig. 10 is a fragmentary sectional view of a battery similar to that of Fig. 6, modified to show the inclusion of means for adjusting the internal battery pressure; and Fig. 11 is a fragmentary top plan view on the line 11—11 of Fig. 10.

Fig. 1 shows at 20 the pressure-versus-thickness ratio of a particular type of cellophane (regenerated cellulose) whose normal film thickness, in the dry and uncompressed state, is 0.025 mm. It will be seen that the thickness decreases only slightly, and approximately linearly, with rising pressure. At 20a, 20b, 20c there is illustrated the behavior under pressure of the same cellophane when soaked with electrolyte; it will be noted that this particular cellophane tends to expand, when unrestrained, to slightly more than three times its original volume, thus having an expansion ratio $\alpha_0$ a little greater than 3 wherein $\alpha$ is the ratio of thicknesses in the wet and in the dry state, respectively. It may be mentioned that other semi-permeable separators, including cellophanes of different manufacture, may have expansion ratios ranging up to well above 3.

A suitable value for $\alpha$, established empirically, has been 2.7, this being the value which for virgin cellophane (curve 20a) corresponds to a pressure of approximately 80 kg./dm.$^2$. From curve 21, Fig. 2, it will be seen that the resistance of cellophane at this pressure is approximately a minimum. It has, accordingly, been proposed to design the internal dimensions of a battery casing in such manner that the cellophane, upon being permeated with electrolyte, will be capable of expanding to only about 2.7 times its original thickness. Subsequent tests have shown, however, that cellophane that has been compressed and re-expanded will, on recompression, diminish in thickness to a greater extent than has been the case under like pressures in its virgin state. This is illustrated in Fig. 1 by curves 20b and 20c applying to a second and a third compression, respectively. Conversely, of course, for a fixed value of α (e. g. 2.7, see dot-dash line) the pressure built up across the cellophane will progressively decrease during successive cycles of compression.

That the separator in a battery of usual construction, i. e. with a casing of constant volume, is actually subjected to successive expansions and recompressions is illustrated in Fig. 3. This graph shows how, in a representative battery, the internal pressure goes through a substantially complete cycle during each charge-discharge period, dropping to a minimum with the battery fully charged and again reaching its maximum at the end of the discharge. A progressive decrease in maximum pressure, explainable at least in part by the fatiguing of the separator material referred to above, is also shown.

It may be mentioned here that the disproportionately large increase observed on discharge in the thickness of the negative electrodes, believed to be the cause of the cyclic pressure variation shown in Fig. 3, may in some instances be overshadowed by other phenomena (e. g. thermal effects) which in certain cases have been found to lead even to a reversal of the conditions illustrated, i. e. to a pressure increase on charge followed by a decrease on discharge. In either case, however, it will be apparent that a cell of constant volume, designed for some particular value of α empirically determined to be an optimum for the specific separator used (not necessarily cellophane), will actually attain its design pressure only during short portions of each cycle and will operate under considerably less favorable conditions over a substantial part thereof.

In accordance with the invention means is provided to change a battery or cell from one having a substantially constant volume to one having substantially constant internal pressure. Graph 22a, Fig. 4, illustrates how the capacity of a conventional constant-volume cell behaves over a number of successive cycles, in terms of percent of the initial capacity which is given the numerical value 100. Graph 22b, same figure, illustrates the capacity variations for a comparable cell of constant pressure, it being apparent that the latter performs in a greatly superior manner. Graphs 23a and 23b, Fig. 5, illustrate the efficiency of a constant-volume and of a constant-pressure cell, respectively, again showing the superiority of the latter.

An embodiment of the invention is shown in Figs. 6 and 7 wherein 30 is the casing of relatively rigid, preferably plastic material, 31 its cover and 32 a movable partition of like material. The partition 32 divides the interior of the casing into two compartments of variable size, namely an electrode compartment (left) and a pressure compartment (right). The compartment to the left of partition 32 contains a series of alternately positive and negative electrodes, consisting essentially of zinc oxide and silver, respectively (in the discharged condition of the cell). The positive electrodes 33 (the active material of which may be sintered) and the negative electrodes 34 are spaced from one another by semi-permeable separators 35, here assumed to consist of cellophane. An alkaline electrolyte 36 (indicated in Fig. 8) permeates the electrode-separator assembly. Terminals 37 (negative) and 38 (positive), connected by leads 39, 40 to the preper electrodes, are mounted on top of the cover 31.

The movable partition 32 is under pressure from a set of coil springs 41 whose other ends bear upon a stationary plate 42. An expandible envelope 43, e. g. a bellows of plastic material as herein shown, encloses the plates 32, 42 and the springs 41 from the bottom and the sides, thereby substantially preventing the entrance of any electrolyte into the pressure compartment to the right of partition 32. It will be understood that this envelope 43 may be omitted, especially in the case of smaller batteries where the amount of additional electrolyte required to fill this compartment is not objectionably large. The envelope 43 may consist of polyethylene.

Since the pressure of the springs 41 will at all times be a predeterminable function of their length, the position of the partition 32 may be read on a scale 51 on the casing for the purpose of ascertaining the instantaneous internal pressure of the cell.

Fig. 8 shows part of a battery generally similar to that of Figs. 6 and 7, the same reference numerals having been used to describe identical parts. The pressure-stabilizing means represented in the preceding embodiment by springs 41 has, however, been modified to take the form of two roughly elliptical springs 141', 141'', each as shown in perspective at 141 in Fig. 9. Each of these springs, as best seen in the last-mentioned figure, comprises two arcuate halves 141a, 141b, spring half 141a being provided both at its top and at its bottom with a center lug 141c received between two spaced lugs 141d of spring half 141b. A recess 141e in spring half 141a and a similar recess 141f in spring half 141b serve to accommodate a vertical rod 144 which in Fig. 8 is shown to pass through the upper spring 141'. Rod 144 has a threaded portion 145, engaging a bushing 146 provided in the cover 31, a knob 147 secured to the projecting upper end of the rod, a disk 148 fastened to the lower end of the rod and bearing upon the upper lugs of spring 141'', and a shoulder 149 fixed to it in such a position as to bear upon the upper lugs of spring 141'. Top spring 141' rests on a bracket 150 secured to the inner right-hand wall of casing 30, whereas bottom spring 141'' rests directly on the bottom of the casing. It will be noted that the plate 42 has been omitted in this embodiment.

The springs 141', 141'' have been initially deformed, by transverse compression, to tend to expand in a horizontal direction, thereby exerting the desired pressure upon the partition 32. This pressure can be augmented by turning the knob 147 in a direction tending to compress the springs vertically, thereby enabling the compression of the electrodes to be periodically restored to substantially its original value after the same has been diminished, from causes previously indicated, in the prolonged use of the battery.

The battery of Figs. 10 and 11 is again similar to that of Figs. 6 and 7, with the major difference that the stationary plate 42 of the former has been replaced by a second movable plate 242, thereby forming a third, or control, compartment to the right of the pressure compartment. Positioned in this third compartment are a stationary wedge 252 fixed to the plate 242, a second, movable wedge 253 interposed between the wedge 252 and the right-hand wall of casing 30, and the lower end of a control rod 244 threadedly engaging wedge 253. Collars 254 and 255, which straddle the cover 31 and prevent axial displacement of the rod 244 while enabling its rotation, as well as a manually operable knob 247 are secured to the rod.

Rotation of the knob 247 will, as will be readily understood, displace the movable plate 242 so as to vary the pressure exerted by the coil springs 41 upon the electrode assembly (not shown in Fig. 10). Knob 247 carries a pointer 256 co-operating with a scale 257; this scale may be calibrated to show increments in pressure when the knob is rotated, the absolute pressure being determinable from the relative position of sliding partitions 32, 242 as read on a scale 51 (cf. Fig. 6).

It will be appreciated that various features of the embodiments shown in Figs. 6, 8 and 10, respectively, may be readily interchanged, so that, for example, the bellows 43 (or an equivalent, expansible envelope of substantially electrolyte-impermeable material, e. g. of rubber) may be used in combination with one or more springs of the type shown in Fig. 9. Also, the pressure control means need not be springs of the type illustrated in the drawing but may be any resilient device (for example, a rubber pad) capable of withstanding the required pressures and exhibiting, within the range of interest, relatively large dimensional changes in response to small increments in pressure, with the result that the pressure exerted by such device upon the electrode assembly will not materially vary because of volume changes of this assembly. Numerous modifications and adaptations will, accordingly, be apparent to persons skilled in the art and may be resorted to without constituting a departure from the spirit and scope of the invention as defined in the appended claims.

I claim:

1. An electric battery comprising a casing with a pair of opposite walls, a substantially vertical partition horizontally movable in said casing between said walls, an electrode assembly in said casing on one side of said partition including a plurality of substantially vertical electrode plates and separator means between said plates, pressure-exerting means inserted in said casing on the other side of said partition between the latter and one of said walls, thereby maintaining said electrode assembly under compression between said partition and the other of said walls, said casing having a transparent wall portion adjacent said partition, and gauge means on said wall portion positioned to co-operate with said partition for indicating the displacement of said partition relative to said walls in response to pressure changes within said casing.

2. A battery according to claim 1, further comprising a liquid electrolyte permeating said electrode assembly and a flexible, electrolyte-impermeable envelope surrounding said pressure-exerting means.

3. An electric battery comprising a casing with a pair of opposite walls, a substantially vertical partition horizontally movable in said casing between said walls, an electrode assembly in said casing on one side of said partition including a plurality of substantially vertical electrode plates and separator means between said plates, adjustable spring means inserted in said casing on the other side of said partition between the latter and one of said walls, thereby maintaining said electrode assembly under compression between said partition and the other of said walls, a cover for said casing overlying said electrode assembly, said partition and said spring means, and control means operatively coupled with said spring means and extending upwardly through said cover for varying the compression of said electrode assembly from without.

4. A battery according to claim 3, wherein said spring means comprises a pair of oppositely curved, interlocking spring elements with horizontally extending bulges, said control means comprising an elongated vertical member passing centrally between said elements and having abutment means bearing upon the ends of said elements for varying the extent of said bulges.

5. A battery according to claim 3, further comprising a first wedge element horizontally displaceable against the action of said spring means and a second wedge element in camming engagement with said first wedge element and vertically displaceable by said control means.

6. A battery according to claim 3, wherein said casing has a transparent wall portion adjacent said partition and gauge means on said wall portion for indicating a displacement of said partition relative to said walls.

References Cited in the file of this patent

UNITED STATES PATENTS

| | | |
|---|---|---|
| 1,379,088 | Edison | May 24, 1921 |
| 1,673,402 | Dam | June 12, 1928 |
| 2,594,713 | Andre | Apr. 29, 1952 |
| 2,602,843 | Brennan | July 8, 1952 |
| 2,640,865 | Brennan | June 2, 1953 |